United States Patent [19]

Smith et al.

[11] Patent Number: 4,685,842

[45] Date of Patent: Aug. 11, 1987

[54] SYSTEM FOR CONTROLLING SOLID TRANSPORT

[75] Inventors: David S. Smith, San Rafael; Harold W. Kamins, Pinole, both of Calif.

[73] Assignee: Chevron Research Company, San Francisco, Calif.

[21] Appl. No.: 677,701

[22] Filed: Dec. 4, 1984

[51] Int. Cl.⁴ .......................................... B65G 53/30
[52] U.S. Cl. ................................. 406/106; 406/108; 406/109; 406/192; 406/197
[58] Field of Search ............. 406/108, 109, 122, 127, 406/168, 169, 192, 23, 106; 414/217; 222/637

[56] References Cited

U.S. PATENT DOCUMENTS

| | | | |
|---|---|---|---|
| 692,106 | 1/1902 | Bedarrides | 406/168 |
| 2,609,249 | 9/1952 | Winter, Jr. | 406/108 X |
| 2,723,883 | 11/1955 | Lapple | 222/637 X |
| 3,316,027 | 4/1967 | Lloyd | 406/122 |
| 3,776,600 | 12/1973 | McLeod, Jr. | 406/168 |

FOREIGN PATENT DOCUMENTS 931187  7/1973  Canada .................. 406/106

Primary Examiner—Jeffrey V. Nase
Attorney, Agent, or Firm—S. R. LaPaglia; W. K. Turner; V. J. Cavalieri

[57] ABSTRACT

A method and apparatus for withdrawal and replacement of solid particles slurried in a fluid employing L-valves is disclosed. The flow through the L-valves is controlled by the control of the flow of separated fluid and the replacement and withdrawal functions are configured so as to permit removal of the solids from the system and addition of fresh material. Control of the fluid flow by means of exerting or controlling pressure on the gas phase in association with it.

8 Claims, 6 Drawing Figures

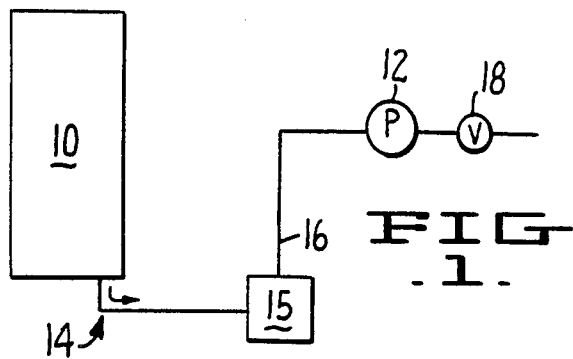
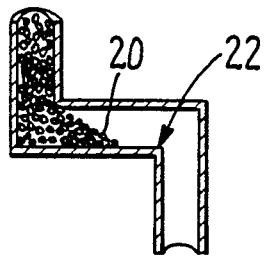 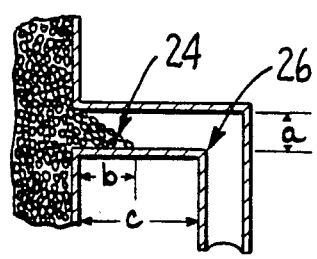 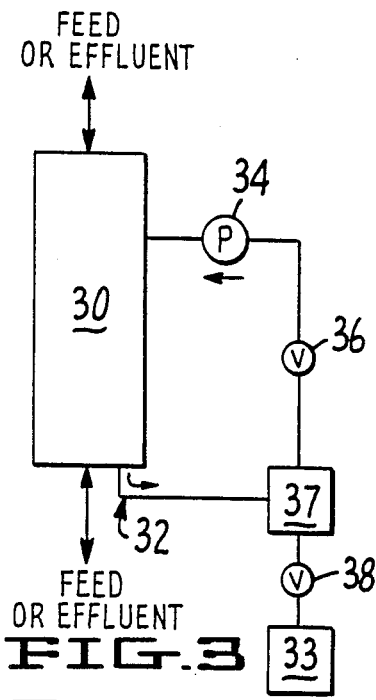
FIG.1.
FIG.2A  FIG.2B
FIG.3
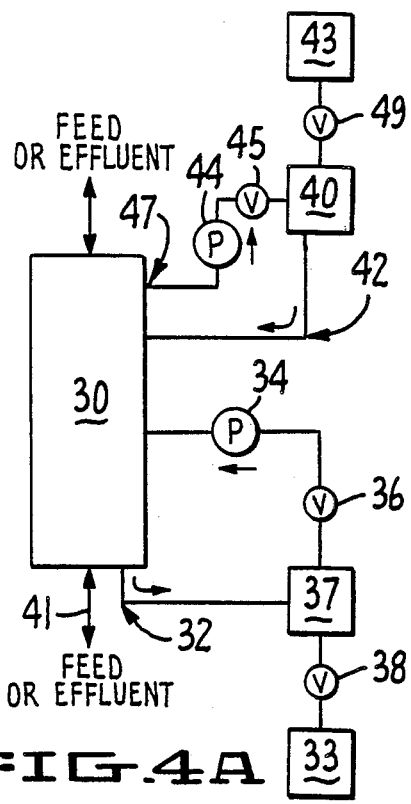 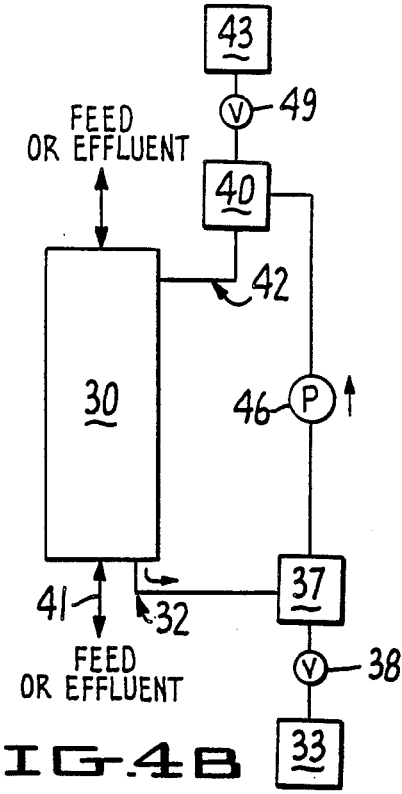
FIG.4A  FIG.4B

SYSTEM FOR CONTROLLING SOLID TRANSPORT

BACKGROUND

This invention relates to the field of controlling the flow of solids in liquid or other fluid suspensions. More particularly, the invention relates to a system for stopping and starting the flow of suspended solids using mechanical valves which are not in communication with the solids in the suspension when they are opened and closed.

Circulation of solid/fluid slurries through conduits or vessels, or both, presents some problems in control of flow which are not present in purely fluid systems. A number of valve designs are available for permitting and preventing the flow of liquids or gases which are capable of functioning over long periods of time with some efficiency. However, the presence of suspended solid particles renders the use of mechanical valve systems at least troublesome because the solids represent a source of abrasion and wear to these mechanical systems.

The necessity for circulating or transferring slurries and for controlling this circulation and the transfer of the solid particles arises in a number of contexts, such as waste water treatment, ion exchange resin beds and manufacturing processes involving supported immobilized enzymes. A particularly important application is the necessity for catalyst replacement in petroleum refining, reforming, and hydroprocessing. Because the reactions such catalysts control generate deposits which progressively inactivate the catalyst, the catalyst needs periodically to be replaced.

Multitudinous approaches to the resolution of this latter problem have been disclosed, including replacement of a reactor's entire content of catalyst where the reactor is operated as a fixed bed. While this approach is relatively simple from an engineering standpoint, it may not be as efficient as a "moving bed" approach. In this approach, the catalyst is continuously replaced, by withdrawal of portions of catalyst, either co-current with the direction of reactant feed (see, e.g., U.S. Pat. No. 3,849,295 to Addison (removal of catalyst from moving bed reactor systems) and U.S. Pat. No. 3,785,963 to Boyd et al (withdrawing uniform amounts of solids from a movable bed)), or countercurrent to reactant feed (see, e.g., U.S. Pat. No. 3,910,834 (where counterflow of catalyst also filters out solids in the feed). Other related approaches have used fluidized or ebullating beds (see, e.g., U.S. Pat. No. 4,217,206 to Nongbri).

Some of the continuous or intermittent replacement systems such as those of the previous paragraph can be operated in fluidized mode while others employ dense phase transport. In a dilute phase or fluidized transport, the solid is in a suspension wherein the properties of the suspension resemble those of a fluid. In a dense phase mode, however, the suspended particles are carried along by the viscous drag of the moving fluid and they are thus not suspended in the fluid in the technical sense. In traditional dilute phase transport, eg, the manner customarily used for transporting grain, 85 to 95% of the suspension is the carrying fluid if the fluid is a gas; about 60–80% is fluid, if liquid is the carrier. In a dense phase mode, about 10 to 50 times less gas or liquid is present as carrying fluid.

Experience in the field of gas/solid transport (as opposed to liquid/solid transport) has shown that the flow of solids in such systems can be controlled by an L-valve. L-valves have not been commonly used in liquid/solid transport. Briefly, an L-valve is a 90° bend in the pathway traversed by the suspension of solids having a vertical and horizontal component. The suspension moves by falling through the vertical component. The horizontal component is of sufficient length relative to the amount of free vertical space above it that, absent the behavior of the suspension as a fluid, the solids dropped through the vertical component would come to rest in a pile corresponding to the angle of repose for the particles. The "valve" will not permit the flow of solid particles past it unless there is sufficient gas pressure behind the direction of flow to dislodge the solid particles from thus resting at their angle of repose. Simply put, the valve is closed to solid flow as long as circulation of gas is terminated; the valve is open to the passage of solids when the flow of gas continues to suspend the particles.

The use of such valves in gas/solid systems has been disclosed in U.S. Pat. No. 4,202,673 relating to coal gasification systems. In this case, the gas flow behind the L-valve is directly regulated in order to control solid transfer. U.S. Pat. No. 2,723,883 discloses another approach to controlling the flow of solids through a 90° angle by offsetting the pressure exerted by a column of solid, thus permitting the height of the column to regulate the discharge of solid through the offset.

The present invention utilizes the L-valve in liquid/solid systems, offers a novel means whereby both solid/liquid systems and solid/gas systems can be used to transport solid particles, whereby both dense phase and fluidized systems are usable in solid transfer, and whereby the control of the solids transport can be achieved without use of mechanical valves in contact with the solid particles, using the fluid of the system itself as a means of control. Thus, the problems of poor control and mechanical wear on the valves are obviated. This is not the case with the presently used systems for controlling solid flow in gases or liquids, such as lock hoppers (which are scored frequently when opened and closed), double valving systems, and let down valves (which are destroyed by high velocity solids).

SUMMARY OF THE INVENTION

The invention provides a means for circulating solid/fluid slurries, starting and stopping the flow of solids, recovering the solids from the circulating slurry, if desired, and resupplying solid/fluid slurry to the system, all without contact between mechanical valving and either solids or solid/fluid slurry.

This is achieved by providing, in the circulating conduit system, at least one L-valve past which the slurry must flow. Subsequent to passage through the L-valve, the slurry is conducted to a settler which permits removal of at least a portion of the fluid forming the slurry. In that portion of the system where a portion of the fluid is flowing absent the solids in the slurry, ordinary valve systems or back pressure can readily be used to stop the flow of fluid. This termination of fluid flow has the effect of placing the L-valve in the off position, and the flow of solids is also stopped. Since the L-valve is simply a configuration and has no moving parts, it is not affected by mechanical wear and tear. Performance of the L-valve is not diminished by the presence of a particulate slurry, unlike mechanical valves; indeed its performance depends on the presence of these solids.

This invention is directed to configurations containing the above-described L-valves which are particularly useful for moving quantities of solids from reaction vessels, for introducing solids into reaction vessels, and for combinations of removal and addition, as well as to a novel means of controlling the flow of the separated fluid.

In one aspect, the invention relates to a means for removing solid particles by employing a collecting tank connected to the settler. In a second aspect, it relates to adding solids to a reaction vessel through an independent L-valve mediated system connected to a reservoir. In a third aspect, the invention relates to a combined system using a single means of fluid flow control so that the L-valve, both for the withdrawal system and the replacement system, are opened and closed simultaneously. In a fourth aspect, the invention relates to controlling the fluid pressure by metering, or exerting pressure against, the gas phase associated with the fluid.

BRIEF DESCRIPTIONS OF THE DRAWINGS

FIG. 1 shows the inclusion of the L-valve using fluid separation to provide controlling means.

FIGS. 2A and 2B show two common L-valve configurations.

FIG. 3 shows use of an L-valve in removing solids to a collecting tank.

FIGS. 4A & 4B show configurations which permit introduction of fresh solid and removal of spent solid from a vessel.

DETAILED DESCRIPTION

A. Definitions

As used herein, "L-valve" refers to a configuration in a conduit path. Typically, the conduit is used to conduct a slurry of solid particles in a fluid suspending medium. The L-valve consists of a 90° deviation in the pathway of the particles and slurry from a vertical path to a horizontal offset wherein the horizontal offset of the path is of sufficient length relative to its (the offset's) vertical dimension that were the particles not either in suspension or subjected to transporting fluid pressure they would accumulate in a pile at the offset corresponding to their angle of repose.

"Radial L-valve" refers to a novel particular embodiment of the L-valve concept. In this embodiment, the flow of solid or slurry is directed downward vertically against the surface of a barrier, for example, a flat plate or a cone whose apex is opposite the direction of the flow. The surface provides shelter for the horizontal surfaces beneath this "roof". If the surface is itself not flat, it is desirable, in terms of assuring optimum flow characteristics, to provide a flat plate directly beneath the "roof" to guide the slurry flow. Under the barrier, for example, under the apex of the cone, is an opening which permits the passage of solids or slurries through another vertical path. The horizontal distance from the circumference of the barrier to the opening under it is sufficient, compared to the height of the barrier from the surface directly beneath it, to permit the angle of repose for the particles to be achieved before the solid spills over into the opening. A more detailed description of this embodiment is set forth below.

"Angle of repose" is used in its conventional sense, and refers to the angle with the horizontal formed by the pile of particulate solids at equilibrium. Thus, to operate properly, an L-valve must have dimensions such that for each path traversed by the particles the height of the horizontal conduit portion divided by the tangent of the angle of repose of the transported solids is less than the distance the solids must travel to reach an outlet at the other end of the horizontal path. For example, for the path shown in FIG. 2B, $\tan R = a/b$; the horizontal component, c, must be $>b$ and therefore $>a/\tan R$.

"Slurry" refers to, in the context of this invention, a mixture of fluid (gas or liquid) and solid wherein the solid fails to dissolve. Thus, the term "slurry" refers both to such mixtures under dilute phase transport conditions and also under dense phase transport conditions. In dense phase, the voidage is not substantially greater than in the packed state, and the weight of particles is not supported by the fluid. Movement of the partices is due to the viscous drag of the fluid. In dilute phase transport, conventionally often referred to as a suspension, the weight of particles is supported by the fluid and the void volume (ie, the portion of the volume occupied by the fluid) is very large. Movement of the particles is thus aided by their own momentum as they are supported by the fluid, and their apparent weight is thus reduced.

Of course, dense phase and dilute phase transport as above defined represent two ends of a continuum, and intermediate states are often encountered. The "slurries" to which the method and apparatus of the invention may be applied are of all these types. In a particular application, it is possible, and even likely that a portion of the slurried material will obey the characteristics of dense phase transport while another portion exhibits dilute phase transport properties.

"Fluid pressure" refers to the force supplied by the fluid portion of the slurry to the solid particles to effect motion of said particles. As discussed above, the nature of this force may vary with the nature of the slurry, but in general this can be defined as a pressure differential in the fluid such that if, in the diagram "A→B", the pressure of the fluid at A is higher than at B, "fluid pressure" encourages the flow of slurried particles from A to B. In the application herein, however, "fluid pressure" and "fluid flow" are often used interchangeably, ie, the fluid exerts pressure by virtue of its flow, and vice versa.

"Settler" refers to a portion of a circulating system which permits the separation of solid and fluid portions at least in sufficient amount so that some of the fluid can be drawn off free from any substantial solid content.

B. General Description

A system employing the elements of the invention can be designed in a variety of configurations. The essential elements are shown in FIG. 1. As shown in FIG. 1, a vessel 10 containing the fluid/solid slurry is connected through an L-valve 14 through a settling vessel 15 to a fluid conduit system. The settler 15 permits a portion of the separated fluid to be drawn through the conduit 16 free of solids, and regulation of the system through regulation of fluid flow.

One means of regulation comprises providing a flow pressure, symbolized by the pump 12. The flow pump provides driving force which causes the flow of the slurry through the system as long as it is applied. when it is decided to stop the flow of solids in the system, the flow pressure is stopped and, if desired, the valve 18 is closed. There is now no circulating fluid or fluid transport pressure, so the the L-valve is closed to the passage of solids. As there is no further flow of solid through the L-valve, there is no further flow of solid to the settler, and it can be removed, if desired, in order to empty it of solids, for example.

(It is by no means necessary that an external source such as the pump 12 be the provider of this flow pressure; the flow pressure could also be due to a higher pressure in vessel 10 than that downstream of valve 18.)

One particular configuration which is effective takes advantage of a gas phase formed over a liquid-based slurry which comprises part of the separation in settler vessel 15. By regulating the pressure of the gas phase, the pressure differential between the reactant vessel 10 and the settler 15 can be conveniently regulated. Thus, by metering the gas phase or by applying reverse gas pressure against it, the flow of fluid, and thereby the flow of solids, can be stopped and started. Clearly, such regulation of gas pressure is independent of contact with the solids traveling through the system.

The general design of several common embodiments of L-valves is shown in FIG. 2. In FIG. 2A the valve is simply a 90° bend in a vertical pipe such that the angle formed by the cumulated solids 20 does not permit the pile of solids to extend beyond the point 22 where further vertical flow could take place. A slight modification of this valve is shown in FIG. 2B as a horizontal takeoff from, for example, a reactor tank. Again, the horizontal surface of the valve extends past the bottom of the pile 24 whose volume and horizontal dimension is limited by the angle of repose and the solids fall short of the bend 26. A particularly preferred alternate embodiment of an L-valve, which can be used in either gas/solid or liquid/solid systems, and which is novel, is discussed in connection with FIG. 5 and 6 below.

While the basic elements of the system are described in FIGS. 1 and 2, it is helpful in understanding the features and advantages of the invention to view it as applied in particular and novel configurations. FIG. 3 shows an embodiment of a system for solid removal from a vessel so that means for removal of solid from the entire system are illustrated and a return of fluid to the vessel is provided. As shown in FIG. 3, the solid is removed from the vessel 30 through an L-valve 32 in a direction co-current or countercurrent to, for example, a reactant feed. As previously described, the L-valve 32 is opened or closed to solids by virtue of control through, for example, a recirculating pump 34 which in this illustration provides the flow pressure through the slurry circulating system, and supplementary regulation at valve 36, which further controls fluid flow through that system. During operation, the valve 38 between the settler and the collecting tank 33 is open. When the L-valve has closed off the flow of solids, and all of the solids from the settler have accumulated in the collecting tank, the valve 38, free from particulate matter can be closed. The collecting tank can then be removed at disconnector means 39 and the solid, e.g., catalyst or ion exchange resin is regenerated independently of the system, if desired. Fresh or regenerated material is then returned to the reactor 30, the collecting tank is reconnected, the valve 38 reopened absent the presence of solid particles, and the recirculation of the slurry started by opening the valve 36 and restarting the pump 34.

In some applications, it is desired to replace, for example, spent catalyst, or used ion exchange resin with fresh material on a continuous or controlled intermittent basis. In such systems, not only are catalysts or resins withdrawn during operation, they are also added back to the reactor, and provision for such addition must be made. A slightly more complex double L-valve system is shown in FIGS. 4A and 4B. These systems include a branch for the addition of fresh solid from a feeding tank 40 which is fed from a reservoir 43, and wherein flow into the reaction vessel is controlled by additional L-valve 42. Such control is desirable as the solids to be added also make mechanical valve systems unsuitable. In FIG. 4A the addition system is controlled by, for example, an independent pump 44 which in this illustration provides fluid flow pressure to insure that L-valve 42 is open for admission of the suspension; by shutting off the pump (and closing valve 45, if desired), the fluid flow pressure is removed, thus closing L-valve 42. The exit line 47 must, of course, be above the level of solids in the vessel 30, and it thus carries only fluid through the valve 45. Additional solid can be admitted to the feeding tank 40 from removable reservoir 43 when valve 49 is open. Valve 49 is closed when addition is complete. The remaining portions of the system, with respect to catalyst or other solid removal from the vessel, are as were described in regard to FIG. 3.

FIG. 4B shows a similar system wherein the addition and removal systems are interconnected through the same pump 46. This system offers some advantage of synchrony between the addition and removal but, of course, does not permit independent control. The remaining features of this system have been described. The slurry circulates thrugh the L-valve 32 when the pump 46 creates a fluid flow pressure. Fluid is removed by permitting the slurry to settle in the settler 37 and the fluid circulated through the pump and into the feeding tank 40. Due to the fluid flow pressure, the slurry also is permitted past L-valve 42 and into the vessel 30. When fluid flow pressure is removed by shutting down pump 46, the L-valves 32 and 42 are closed to solids, and collection tank 33 can be removed at disconnector means 39 from the system. While in the foregoing illustrations a pump has been used to supply the fluid flow pressure, other means, such as vacuum outlets or regulation of gas flow, as explained above, could also be used.

As explained above, the embodiments in FIGS. 3 and 4 show a reactor feed as optionally co-current or countercurrent to the solid particle circulation. For those constructions where the feed is co-current, a filter or screen or other solids flow impeder may be required at the feed exit to prevent loss of such solid particles through the exit line.

We claim:

1. A method for recovering solids from a vessel which method comprises:
   (a) withdrawing from the vessel a liquid slurry of the solids through an L-valve;
   (b) conducting the slurry exiting the L-valve past a collecting tank;
   (c) separating a portion of the liquid from the slurry exiting the L-valve;
   (d) terminating the flow of the separated liquid;
   (e) permitting the solids to settle to the bottom of the collecting tank; and
   (f) disconnecting the collecting tank.

2. A method for removing and replacing solids from and into a vessel which method comprises:
   (a) withdrawing a first liquid slurry of the solids from the vessel through a first L-valve;
   (b) conducting the slurry exiting the L-valve past a collecting tank;

(c) separating a portion of the liquid from the slurry exiting the first L-valve:
(d) terminating the flow of the separated liquid;
(e) permitting the solids to settle to the bottom of the collecting tank;
(f) disconnecting the collecting tank;
(g) supplying a second liquid slurry of solids to the vessel through a second L-valve;
(h) separating a portion of the liquid from the second slurry exiting the second L-valve;
(i) controlling the flow of the separated liquid.

3. A method for adding solids to a vessel which method comprises:
(a) supplying a liquid slurry of solids through an L-valve to the vessel;
(b) separating a portion of the liquid from the slurry exiting the L-valve; and
(c) controlng the flow of the separated liquid.

4. A method for simultaneous withdrawal, removal, and replacement with fresh solids for a reaction vessel, which method comprises
(a) withdrawing a liquid slurry of the solids from the reaction vessel through a first L-valve;
(b) separating at least a portion of the liquid from the slurry exiting the L-valve;
(c) controlling the flow of the separated liquid.
(d) circulating the separated liquid into a feeding tank containing fresh solid to form a slurry;
(e) conducting the slurry through an L-valve into the reaction vessel.

5. The method of claim 4 which further includes conducting the slurry past a collecting tank, terminating the flow of separated liquid in (c), permitting the solids to settle to the bottom of the collecting tank, and disconnecting the collecting tank.

6. An apparatus for simultaneous withdrawal, removal, and replacement with fresh solids for a reaction vessel, which apparatus comprises:
(a) a means for withdrawing a liquid slurry of the solids from the reaction vessel through a first L-valve;
(b) a means for separating at least a portion of the liquid from the slurry exiting the L-valve;
(c) a means for controlling the flow of the separated liquid;
(d) a means for circulating the separated liquid into a feeding tank containing fresh solid to form a slurry; and
(e) a means for conducting the slurry through an L-valve into the reaction vessel.

7. The apparatus of claim 6 which further includes a means for conducting the slurry past a collecting tank, a means for terminating the flow of separated liquid in (c), a means for permitting the solids to settle to the bottom of the collecting tank, and a means for disconnecting the collecting tank.

8. A method for controlling the transport of solid particles which are slurried with a liquid which method comprises:
(a) passing the slurried solids through an L-valve;
(b) separating a portion of the liquid from the slurry exiting the L-valve; and
(c) controlling the gas phase pressure against the flow of the separated liquid.

* * * * *